Patented Sept. 26, 1950

2,524,025

UNITED STATES PATENT OFFICE 2,524,025

PROCESS FOR PRODUCING 1-ACYLOXY-3-BUTENE-2-ONES

Joseph M. Wilkinson, Jr., Easton, Pa., assignor to General Aniline & Film Corporation, New York, N. Y., a corporation of Delaware No Drawing. Application November 14, 1947,
Serial No. 786,161

2 Claims. (Cl. 260—491)

This invention relates to an improved method for the production of 1-acyloxy-3-butene-2-ones by the isomerization of the corresponding 1-acyloxy-4-hydroxy-2-butyne.

Certain 1-acyloxy-3-butene-2-ones (particularly 1-acetoxy-3-butene-2-ones) have heretofore been described and are known to be easily polymerizable substances whose polymer resembles polyvinyl acetate in appearance.

I have now discovered that 1-acyloxy-3-butene-2-one may readily be obtained from the isometric 1-acyloxy-4-hydroxy-2-butyne by treating a solution thereof with a mercuric ion catalyst. The course of the reaction, as well as the type of reactants which may be employed and the products produced, may be summarized with reference to the following equation:

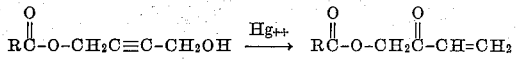

wherein R stands for the residue of a fatty acid.

The process of the present invention will be apparent to those skilled in the art from a consideration of the following specific example, in which the parts are by weight:

Example 128 grams (1 mol) of 1-acetoxy-2-butyne-4-ol were dissolved in 200 cc. of acetone containing 10 grams of mercuric sulfate. The mixture was stirred for 4 hours, during which time the temperature rose to 60° C. and the solution became dark brown in color. It was then treated with activated charcoal and filtered and the acetone distilled off from the filtrate at atmospheric pressure. The residue was then distilled under vacuum and 45 grams (35%) of 1-acetoxy-3-butene-2-one obtained (B. P. [12 mm.]83–85° C.). The still residue was an intractable polymeric mass.

It will be understood that the foregoing example illustrates a specific embodiment of the present invention and that various changes may be made therein without departing from the spirit of the present invention or the scope of the appended claims. Thus, in place of the acetone employed in the specific example, the process has been successfully operated using such solvents as water, aqueous acetic acid and glacial acetic acid and it appears that any inert solvent is effective and may be used in amounts sufficient to give a readily-fluid reaction mass. Likewise, it is to be understood that in place of mercuric sulfate employed in the above example, the isomerization of the present invention may be catalyzed by any mercuric ion catalysts. As examples of suitable catalysts may be mentioned mixtures of mercuric oxide and boron trifluoride and acidic mixtures of mercuric sulfate, such as mercuric sulfate in sulfuric acid.

It will also be understood that the acyloxy group present in the unsaturated ketone obtained as a product will correspond to the acyloxy group present in the acetylenic half ester employed as the starting material. As examples of 1-acyloxy-3-butene-2-ones which may readily be isomerized to the corresponding 1-acyloxy-4-hydroxy-2-butynes may be mentioned the half esters of acetylenic diols of the type described in my copending application Serial No. 786,162, filed November 14, 1947, now Patent No. 2,520,750, such as the half esters of lower aliphatic acids such as acetic, propionic, butyric, isobutyric and valeric acids and of higher fatty acids such as capric, lauric, myristic, palmitic and stearic acid. Of these the half esters of the saturated lower aliphatic acids, particularly acetic acid, yield products having the widest field of utility and are therefore preferred.

As indicated by the foregoing example, the reaction of the present invention is exothermic, particularly when the half esters of lower aliphatic acids with 2-butyne-1,4-diol are employed and proceeds readily without outside heating. With the half esters of higher fatty acids, some slight heating may be necessary to initiate a reaction and, if necessary, the reaction mixture may be warmed up to a temperature of say 100° C. and maintained at this temperature in order to effect the desired isomerization reaction at an economical rate.

I claim:

1. The method of producing 1-acyloxy-3-butene-2-ones, which comprises subjecting 1-acyloxy-4-hydroxy-2-butyne to the action of a mercuric ion catalyst in the presence of an inert solvent.

2. The process of producing 1-acetoxy-3-butene-2-one, which comprises subjecting 1-acetoxy-4-hydroxy-2-butyne to the action of a mercuric ion catalyst in the presence of an inert solvent.

JOSEPH M. WILKINSON, Jr.

REFERENCES CITED

The following references are of record in the file of this patent:

Abstract of an article from Bull. Soc. Chim. 11 (1944), pgs. 514–515.

Lozac'h Chemical Abstracts, vol. 40, col. 2114 (1946).